UNITED STATES PATENT OFFICE.

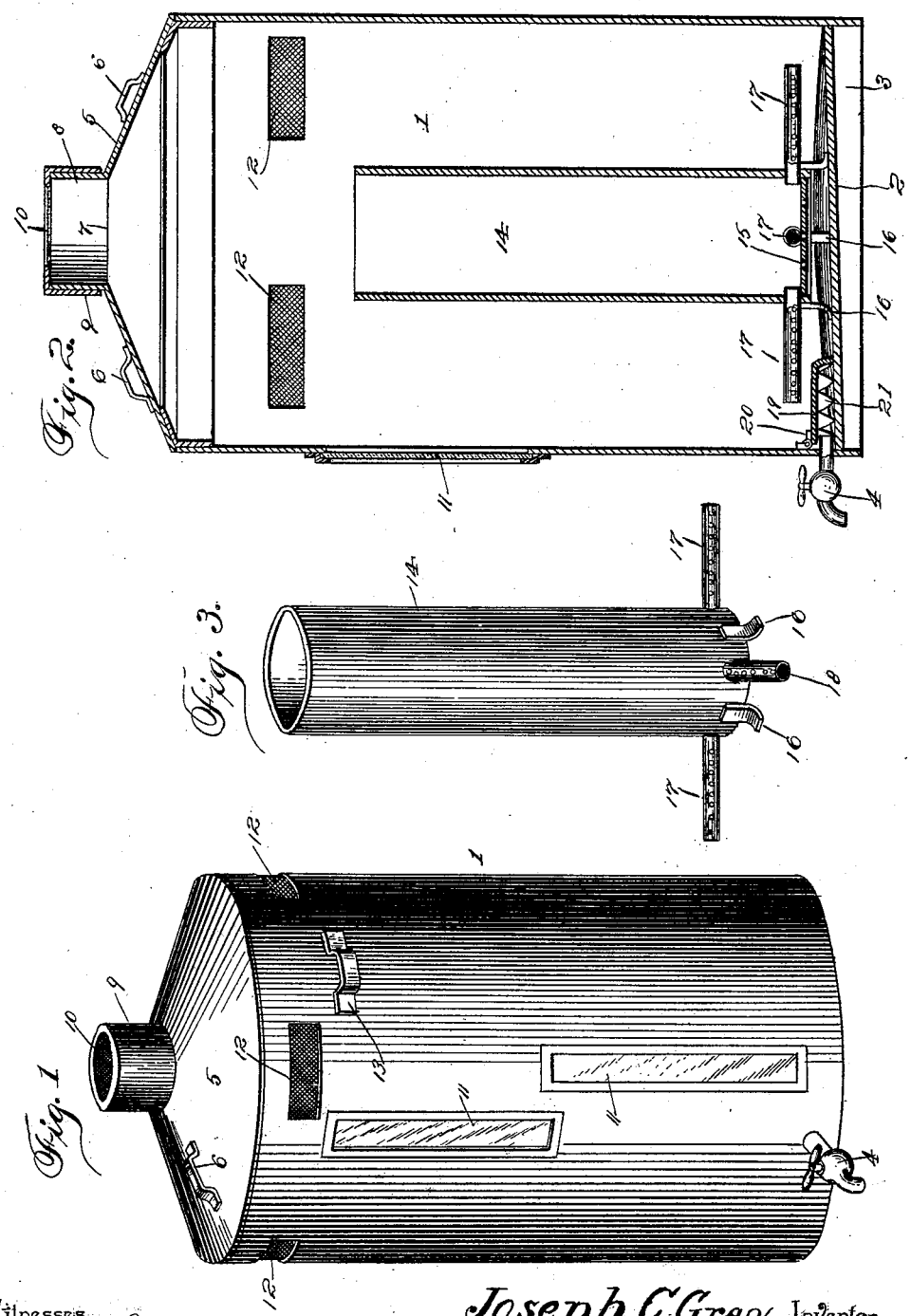

JOSEPH C. GRAY, OF AURORA, INDIANA.

CREAM-SEPARATOR.

SPECIFICATION forming part of Letters Patent No. 689,871, dated December 31, 1901.

Application filed November 19, 1900. Serial No. 37,065. (No model.)

*To all whom it may concern:*

Be it known that I, JOSEPH C. GRAY, a citizen of the United States, residing at Aurora, in the county of Dearborn and State of Indiana, have invented a new and useful Cream-Separator, of which the following is a specification.

This invention relates to cream-separators of that class which employs a cream-separating agent applied directly to the milk, and has for its object to provide improved means for supplying the separating agent in a convenient and effective manner with the slightest possible agitation to the volume of milk. It is furthermore designed to arrange the parts of the device so as to be conveniently separated for the purpose of cleansing the same, and thereby provide a sanitary device.

With these and other objects in view the present invention consists in the combination and arrangement of parts, as will be hereinafter described, shown in the accompanying drawings, and particularly pointed out in the appended claims, it being understood that changes in the form, proportion, size, and minor details may be made within the scope of the claim without departing from the spirit or sacrificing any of the advantages of the invention.

In the drawings, Figure 1 is a perspective view of a cream-separator constructed in accordance with the present invention. Fig. 2 is a central longitudinal sectional view thereof. Fig. 3 is a detail perspective view of the distributer for the cream-separating agent.

Like characters of reference designate corresponding parts in all of the figures of the drawings.

Referring to the drawings, 1 designates the body of the separator, which is in the form of a cylindrical can or other receptacle, having an open upper end and a reëntrant bottom 2, so as to form a marginal foot-flange 3 for the support of the receptacle. As best indicated in Fig. 2 of the drawings, it will be seen that the bottom inclines downwardly and forwardly and also downwardly and inwardly in opposite directions at substantially right angles to the forward pitch, so as to provide a gutter or trough to drain the can. A suitable faucet or stop-cock 4 communicates with the interior of the can and is located at the lowermost portion of the bottom thereof, so as to effectively drain the receptacle.

The open top of the receptacle is normally closed by means of a removable lid or cover 5, having suitable handles 6 for manipulation thereof. This lid is preferably convex or conical in form and has a central opening 7, from the walls of which rises a short tube 8 for the reception of a removable cap 9, having a perforate top 10, so as to form a ventilator for the escape of the animal heat and odors of the milk.

One or more longitudinal glass-covered slots 11 are formed in the front of the can, so as to view the dividing-line between the cream and the milk for the purpose of accurately drawing the milk and the cream separately from the device. Suitable screen-covered openings 12 are formed in the upper portion of the can for the purpose of providing additional ventilators, and a suitable handle 13 is provided upon the exterior of the can.

Located centrally within the can is an imperforate tubular distributer 14, which is employed for applying the cream-separating agent to the milk. The top of this distributer is normally open and has a perforate bottom 15, which is spaced upwardly from the bottom of the can by means of suitable feet 16 in order that the water contained within the distributer may be sprayed downwardly therefrom. A plurality of perforate radial sprayer-tubes 17 are carried by the lower end of the distributer and in communication with the interior thereof. As best indicated in Fig. 3 of the drawings, it will be seen that the outer end of each tube is also perforated or covered with a suitable screen 18 in order that the water may not be suddenly and violently discharged from the tube.

The inner end of the stop-cock is protected by means of a guard-plate 19, which is connected to the adjacent wall of the can by means of a hinge 20, located immediately above the stop-cock. This plate is also provided with a notched peripheral pendent flange 21, the points between the notches resting upon the bottom of the can, so that the contents of the can may gain access to the stop-cock across the bottom of the receptacle only, whereby the contents of the receptacle is drawn off from the bottom thereof, and the upper portions may not have direct access to the stop-cock. By this arrangement there is no liability of the cream and the skimmed milk being mixed in drawing off the contents of the device.

In using the device the milk is poured into the can or receptacle, and the distributer is placed within the milk with its feet resting upon the bottom of the can, after which cold water is poured into the distributer through its open top and from which it escapes through the perforate bottom and the perforate tubes with the slightest possible agitation to the milk and is applied directly to the bottom of the entire volume thereof. By means of the radial perforate tubes the water is applied over a greater area than is afforded by the perforate bottom of the distributer. Also the body of the distributer is imperforate, so that the water is applied at the bottom only of the milk. When the separation of the cream has been completed, as may be discerned through the transparently-covered slot in the can, the skimmed milk is first drawn off through the stop-cock, and finally the cream, which rises to the top of the milk, is drawn off separately from the milk.

From the foregoing description it will be understood that the distributer is free to be removed for being cleansed, and the protector plate or cap 19 is hinged to the receptacle in order that it may be held in place and at the same time be movable to permit of cleansing that portion of the can which is covered by the plate, whereby the present device provides a completely sanitary separator. Moreover, it will be observed that the cover and the distributer are entirely independent, so that the cover or top may be removed for the introduction of milk, while the distributer remains within the receptacle, and also the upper open end of the distributer is in line with the central opening of the top, whereby water may be introduced into the distributer without removing the top of the receptacle. The open upper end of the distributer is terminated short of the cover, so as to leave the opening in the cover unobstructed for the free escape of the animal heat rising from the surface of the milk around the distributer, whereby the opening in the cover forms an inlet for the water and a ventilator for the outlet of the animal heat without exposing the entire surface of the milk.

What is claimed is—

A cream-separator of the class described, comprising a cream-receptacle having an open top, and means for drawing off the contents thereof from the bottom of the receptacle, a removable cover for the receptacle and having an opening formed therein, a removable screen-covered closure for the opening, and a water-distributer supported within the receptacle, the upper end of the distributer being open, terminated short of the cover and alined with the opening therein to receive water introduced through said opening, the opening in the cover forming a water-inlet and also a ventilator for the outlet of animal heat rising from the milk, and the lower portion of the distributer having outlets for the distribution of water within the interior of the cream-receptacle.

In testimony that I claim the foregoing as my own I have hereto affixed my signature in the presence of two witnesses.

JOSEPH C. GRAY.

Witnesses:
CHARLES F. ROSS,
CHAS. ERIT.